(12) United States Patent
Fuji et al.

(10) Patent No.: US 8,486,240 B2
(45) Date of Patent: Jul. 16, 2013

(54) CERAMIC ELECTRODE MATERIAL AND MANUFACTURING METHOD THEREOF

(75) Inventors: Masayoshi Fuji, Nagoya (JP); Minoru Takahashi, Nagoya (JP); Jingjun Liu, Nagoya (JP); Hideo Watanabe, Nagoya (JP); Takashi Shirai, Nagoya (JP)

(73) Assignee: National University Corporation Nagoya Institute of Technology, Nagoya-Shi (JP)

( * ) Notice: Subject to any disclaimer, the term of this patent is extended or adjusted under 35 U.S.C. 154(b) by 0 days.

(21) Appl. No.: 13/125,221

(22) PCT Filed: Oct. 20, 2009

(86) PCT No.: PCT/JP2009/068051
§ 371 (c)(1),
(2), (4) Date: Apr. 20, 2011

(87) PCT Pub. No.: WO2010/047321
PCT Pub. Date: Apr. 29, 2010

(65) Prior Publication Data
US 2011/0198218 A1 Aug. 18, 2011

(30) Foreign Application Priority Data
Oct. 21, 2008 (JP) ................................. 2008-270911

(51) Int. Cl.
| C25B 11/04 | (2006.01) |
| C25B 11/06 | (2006.01) |
| C25B 11/12 | (2006.01) |
| H01M 4/86 | (2006.01) |
| H01M 4/88 | (2006.01) |
| H01M 4/90 | (2006.01) |
| H01M 4/96 | (2006.01) |

(52) U.S. Cl.
USPC ........... 204/291; 204/292; 204/294; 429/523; 429/528; 429/530; 429/531; 429/532; 429/533; 429/534

(58) Field of Classification Search
USPC .................. 204/291, 292, 294; 429/523, 528, 429/530, 531, 532, 533, 534
See application file for complete search history.

(56) References Cited

U.S. PATENT DOCUMENTS
2006/0213768 A1   9/2006   Mizuno et al.

FOREIGN PATENT DOCUMENTS

| JP | A-03-199360 | 8/1991 |
| JP | A-05-156395 | 6/1993 |
| JP | A-06-132067 | 5/1994 |
| JP | B2-3116664 | 12/2000 |
| JP | A-2001-199764 | 7/2001 |
| JP | A-2004-018296 | 1/2004 |
| JP | A-2004-212341 | 7/2004 |
| JP | B2-3665661 | 9/2004 |
| JP | A-2005-197178 | 7/2005 |
| JP | A-2005-289695 | 10/2005 |
| JP | A-2006-265629 | 10/2006 |
| JP | A-2007-112705 | 5/2007 |

OTHER PUBLICATIONS

Dec. 28, 2009 Written Opinion issued in International Patent Application No. PCT/JP2009/068051 (with translation).
International Search Report in International Application No. PCT/JP2009/068051; dated Dec. 28, 2009 (with English-language translation).
Mar. 7, 2012 Chinese Office Action issued in Chinese Application No. 200980141881.6 with partial English-language translation.
Nov. 26, 2012 Chinese Office Action issued in Chinese Application No. 200980141881.6 with partial English-language translation.

Primary Examiner — Bruce Bell
(74) Attorney, Agent, or Firm — Oliff & Berridge, PLC

(57) ABSTRACT

A corrosion-resistant ceramic electrode material includes ceramic particles and, present between them, a three-dimensional network electroconducting path composed of a reductively fired product of a carbon-containing polymeric compound. This material is manufactured by a method in which a polymerization reaction of a polymerizable monomer previously contained in a ceramic slurry is performed to gel the ceramic slurry to thereby give a green body; and after drying and degreasing, the green body is fired in a reducing atmosphere.

14 Claims, 1 Drawing Sheet

CERAMIC ELECTRODE MATERIAL AND MANUFACTURING METHOD THEREOF

TECHNICAL FIELD

The present invention relates to a ceramic electrode material and a manufacturing method thereof, which ceramic electrode material has such corrosion resistance and electroconductivity as to be usable as an electrode material.

BACKGROUND ART

In various industries using electrochemical reactions, e.g., widely ranging industries from the electrolysis industry to the fuel cell industry which has been developed more and more, materials for electrodes to be used require not only electroconductivity but also corrosion resistance in the presence of a liquid such as water. Typically, electrode corrosion under severe acidic or basic conditions should be avoided in seawater electrolysis and soda electrolysis. Independently, electrode corrosion by the action of carbon monoxide in raw-material hydrogen, which is obtained by a reforming reaction, should be avoided in fuel cells.

As possible solutions to these problems, there have been proposed techniques such as (1) development of alloys (e.g., a Ni—Ti alloy (PTL 1), an alloy containing a rare-earth element (PTL 2), and a stainless steel (PTL 3)); (2) plating with a noble metal element (e.g., the formation of a platinum-plated layer on a Ti alloy (PTL 4)); and (3) coating of a metal electrode with a resinous film (e.g., coating of a platinum wire with an insulating film (PTL 5)). These techniques, however, still have problems from viewpoints of factors other than corrosion resistance, such as workability and economical efficiency.

Under such circumstances, the adaptation of ceramic materials to electrode materials has been examined. Ceramics are mainly composed of oxides, carbides, nitrides, and/or borides of inorganic elements and generally excel in mechanical strength and corrosion resistance. However, ceramics, if to be used as electrode materials, should be imparted with electroconductivity by a process of some sort, because the ceramics themselves have no electroconductivity. Typically, there have been proposed a technique of allowing a rare-earth-element-containing organic carbon compound to be present at grain boundaries of aluminum nitride (PTL 6); a technique of coating a metal constituting the electrode with aluminum oxide (PTL 7); a technique of applying a thin film of oxide ceramic to a metallic electrode substrate through a sol-gel process (PTL 8); and a technique of forming an electroconducting path between ceramic particles, which electroconducting path is composed of a reductively fired product of a polymeric compound (PTL 9).

CITATION LIST

{Patent Literature}

PTL 1: Japanese Patent No. 1921459
PTL 2: Japanese Unexamined Patent Application Publication (JP-A) No. H05-156395
PTL 3: Japanese Patent No. 3565661
PTL 4: Japanese Patent No. 3116664
PTL 5: Japanese Unexamined Patent Application Publication (JP-A) No. 2006-265629
PTL 6: Japanese Unexamined Patent Application Publication (JP-A) No. 2007-112705
PTL 7: Japanese Unexamined Patent Application Publication (JP-A) No. 2004-212341
PTL 8: Japanese Unexamined Patent Application Publication (JP-A) No. H06-132067
PTL 9: Japanese Unexamined Patent Application Publication (JP-A) No. 2005-289695

SUMMARY OF INVENTION

{Technical Problem}

However, the known techniques still have various problems and do not lead to a drastic solution, because typically of increased manufacturing cost due to the use of rare-earth metals, problems in workability such as limited dimensions and shape of the electrode, and complicated manufacturing processes. The electroconductive ceramic disclosed in PTL 9 has certain corrosion resistance and electroconductivity but is still susceptible to further improvements for being used as an electrode material.

The present invention has been made under these circumstances, and an object thereof is to provide a ceramic electrode material which has suitable electroconductivity and excellent corrosion resistance for use as an electrode material. Another object of the present invention is to provide a method for economically efficiently manufacturing such a ceramic electrode material with excellent workability.

{Solution to Problem}

The present invention provides, in a first embodiment, a ceramic electrode material which includes a ceramic sintered compact, the ceramic sintered compact including ceramic particles; and a three-dimensional network electroconducting path being present in space between ceramic particles and including a reductively fired product of a carbon-containing polymeric compound, the ceramic sintered compact being prepared through reducing firing in an inert gas atmosphere containing no nitrogen gas, the ceramic electrode material having a volume resistivity of less than 0.2 Ω·cm and having corrosion resistance against acids and bases equivalent to or higher than that of graphite or a vitreous carbon material.

In a second embodiment of the present invention, the reductively fired product is an electroconductive carbon, and the ceramic sintered compact has a carbon content of 0.3 percent by mass or more and 1.7 percent by mass or less.

In a third embodiment of the present invention, the ceramic particles include an inorganic oxide.

In a fourth embodiment of the present invention, the inorganic oxide is alumina.

In a fifth embodiment of the present invention, ceramic sintered compact carries or bears microparticles including one selected from the group consisting of a metal, a metallic compound, a metal oxide, and a mixture of two or more of them and thereby has a catalytic capability on methanol oxidation reaction.

In a sixth embodiment of the present invention, the ceramic sintered compact is porous, in addition to the configuration according to the fifth embodiment.

In a seventh embodiment of the present invention,
the metal is at least one selected from the group consisting of platinum, nickel, palladium, and gold,
the metal oxide is at least one selected from the group consisting of titanium oxides and zinc oxides, and
the metallic compound is at least one selected from the group consisting of cadmium sulfide and strontium titanate.

In an eighth embodiment of the present invention, the polymeric compound is one selected from the group consisting of vinyl resins, urethane resins, olefinic resins, styrenic resins, acrylic resins, haloolefinic resins, diene resins, ether resins, sulfide resins, imide resins, imine resins, phenylene resins, and epoxy resins.

The present invention further provides, in a ninth embodiment, a method for manufacturing a ceramic electrode material, the method including the steps of:

placing a composition in a mold, the composition including a ceramic raw material and at least one polymerizable material intramolecularly having one or more carbon atoms and polymerizing the polymerizable material in the mold to give a green body uniformly including a polymeric compound as a polymer derived from the polymerizable material; and subjecting the green body to reducing firing in an inert gas atmosphere containing no nitrogen gas to give a ceramic sintered compact and to form a three-dimensional network electroconducting path in space between ceramic particles constituting the ceramic sintered compact, the electroconducting path including a reductively fired product of the polymeric compound.

In a tenth embodiment of the present invention, a polymerizable monomer is used as the polymerizable material.

In an eleventh embodiment of the present invention, the polymerizable monomer and a crosslinkable monomer are used as the polymerizable material.

In a twelfth embodiment of the present invention, an unsaturated vinyl monomer is used as the polymerizable monomer. In a thirteenth embodiment of the present invention, the composition is prepared in the form of an aqueous slurry and the polymerizable material is a hydrophilic or water-soluble material. In a fourteenth embodiment of the present invention, the method includes controlling the carbon content of the entire polymerizable material in the green body before firing to be 0.1 part by mass or more and 6 parts by mass or less per 100 parts by mass of the ceramic raw material: and subjecting the green body to reducing firing to thereby allow the ceramic sintered compact to have a carbon content of 0.3 percent by mass or more and 1.7 percent by mass or less.
{Advantageous Effects of Invention}

The ceramic electrode material according to the present invention has corrosion resistance equivalent to or higher than that of other electroconductive carbon materials such as vitreous carbon materials and graphite, because the ceramic electrode material includes an electroconducting path which is composed of a reductively fired product of a polymeric compound and which is formed in space between ceramic particles, in which the electroconducting path itself is covered by the highly corrosion-resistant ceramic particles in portions other than the surface of the sintered compact and will be exposed in a smaller apparent area to a corrosive environment.

The ceramic electrode material according to the present invention which may be manufactured by the manufacturing method therefor has a electroconductivity suitable as an electrode material. This is because the ceramic electrode material is manufactured by reducing firing in an inert gas atmosphere containing no nitrogen gas, whereby a reductively fired product of the polymeric compound is sufficiently formed between the ceramic particles. Specifically the ceramic sintered compact has a carbon content of 0.3 percent by mass or more and 1.7 percent by mass or less, and the ceramic electrode material thereby has a volume resistivity of less than 0.2 Ω·cm.

The manufacturing method for the ceramic electrode material according to the present invention may give a green body having an arbitrary complicated shape, because the green body is formed through the polymerization reaction of the polymerizable material and the mold to be used therein can have any arbitrary shape. In addition, the method may give a desired electrode material in a simple and convenient manner without needing a complicated after processing, because the manufactured green body is obtained in a wet state including the polymeric compound uniformly distributed, and will be isotropically shrunk in subsequent drying, degreasing, and sintering processes, and the mold for use herein may be designed and prepared in previous consideration of the percentage of shrinkage of the green body to give the desired electrode material. According to the method, a porous ceramic containing and holding pores inside thereof may be manufactured by mixing the ceramic particles and polymerizable monomer with water to give a mixture, introducing bubbles into the mixture typically through mechanical stirring, placing the resulting mixture in a mold, and forming a green body from the mixture through the polymerization reaction of the polymerizable monomer. In this procedure, the pore structure may be easily controlled by controlling the introduction of bubbles. Accordingly, the manufacturing method is superior in formability, pore structure controllability, and economical efficiency in manufacturing processes to customarily developed manufacturing methods for corrosion resistant electrode materials.

DESCRIPTION OF EMBODIMENTS

Figure 1:
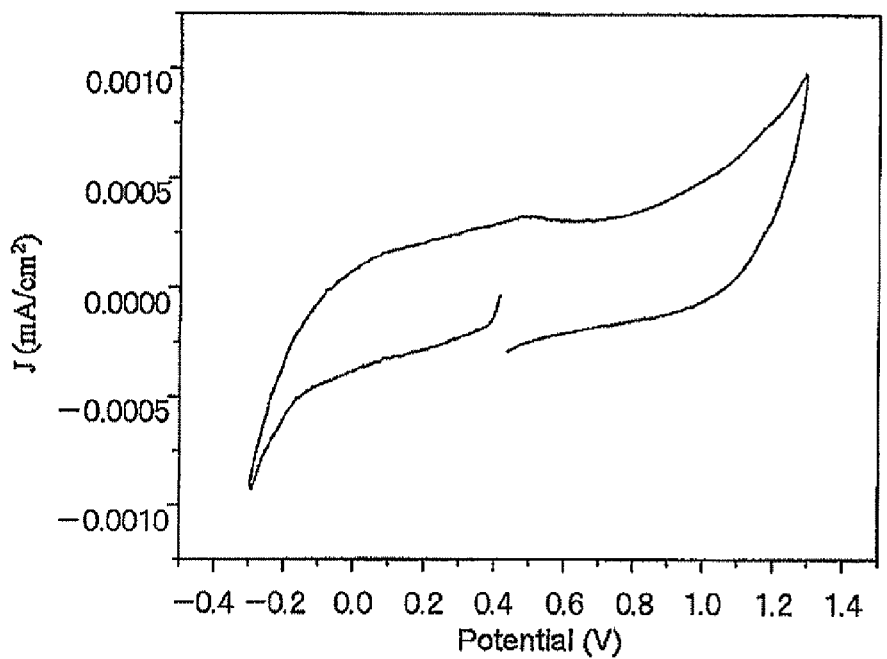
FIG. 1 is a graph indicating the electrochemical properties (current-potential curve) of a porous ceramic bearing nickel microparticles.

For advantageously manufacturing a corrosion-resistant ceramic electrode material according to the present invention, a composition is initially prepared by blending a ceramic raw material and a polymerizable material intramolecularly having one or more carbon atoms.

The ceramic raw material (raw material for ceramics) for use in the present invention may be any one selected from customarily known ceramics, and examples thereof include oxide ceramics such as alumina, mullite, and zirconia ceramics; and non-oxide ceramics such as silicon carbide, silicon nitride, aluminum nitride, and boron nitride ceramics. Among them, oxide ceramics are advantageously used in the present invention, of which alumina ceramics are more advantageous. This is because if aluminum nitride, which is resistant to sintering, is used as the ceramic raw material as in PTL 6, one or more rare-earth metals should be used as sintering agents, resulting in increased manufacturing cost; but oxide ceramics such as alumina are easy to be sintered (sinterable) and there is no need of using rare-earth metals as sintering agents.

The ceramic raw material, when used in the preparation of the composition, is generally used as a powdery or granular substance. Such powdery or granular substance has a size (average particle diameter) of about 0.1 to 10 μm, preferably about 0.1 to 5 μm, and more preferably about 0.1 to 1 μm. This is probably because the powdery substance (granular substance), if having an excessively large or excessively small average particle diameter, may not give a sintered compact having sufficient strength.

The polymerizable material intramolecularly having one or more carbon atoms (hereinafter simply referred to as "polymerizable material") to be incorporated with the ceramic raw material having such a predetermined size may be any substance which is polymerizable in a mold and which may give a green body uniformly including the ceramic raw material and the resulting polymer (polymeric compound) formed through polymerization. The polymerizable material may be any substance which gives a desired polymer through polymerization and may be not only a monomer but also a substance derived from the monomer through partial polymerization to some extent.

Specific examples of the polymerizable material are binders (bonding materials) to be incorporated in ceramic raw materials for the manufacturing of customary ceramic products, including methacrylamide and other unsaturated vinyl monomers; polyols and isocyanate compounds which give, when used in combination, urethane resins; and epoxy resins which undergo intermolecular crosslinking when used in combination with predetermined curing agents. Among them, methacrylamide and other unsaturated vinyl monomers are advantageously used in the present invention. As used herein the term "unsaturated vinyl monomers" means all compounds which can form polymers (vinyl resins) through cleavage and addition of carbon-carbon double bonds in the compounds and includes, for example, vinyl compounds, vinylidene compounds, and vinylene compounds.

The unsaturated vinyl monomer as mentioned above, when used as the polymerizable material, is preferably used in combination with a crosslinkable monomer. The combination use of the unsaturated vinyl monomer and the crosslinkable monomer may advantageously give a polymeric compound having a three-dimensional network structure in a green body obtained through polymerization of these monomers in the mold. The crosslinkable monomer may be suitably chosen from among known bifunctional or multifunctional compounds according to the type of the unsaturated vinyl monomer to be used. For example, when methacrylamide is used as the unsaturated vinyl monomer, N,N'-methylenebisacrylamide is typically advantageously used.

The product (reductively fired product) formed from the polymer (polymeric compound) of the polymerizable material through reducing firing functions as an electroconducting path in the ceramic sintered compact in the electroconductive ceramic product according to the present invention. Accordingly, a composition, if containing the polymerizable material in a small content, may cause a ceramic sintered compact to fail to exhibit sufficient electroconductivity, which ceramic sintered compact is obtained through reducing firing of a green body derived from the composition. To avoid this and to give a ceramic sintered compact exhibiting sufficient electroconductivity, specifically, to give a ceramic sintered compact having a volume resistivity of less than 0.2 $\Omega \cdot$cm, the amount of polymerizable material is determined such that the carbon content (mass) in the entire polymerizable material be 0.1 part by mass or more, and preferably about 0.1 to 6 parts by mass, per 100 parts by mass of the ceramic raw material.

The polymerization of the polymerizable material may be generally performed using agents, such as a polymerization initiator and/or a polymerization catalyst, corresponding to the polymerizable material. Exemplary polymerization initiators usable herein include ammonium persulfate, potassium persulfide, organic peroxides, hydrogen peroxide compounds, azo compounds, and diazo compound; and exemplary polymerization catalysts usable herein include N,N,N',N'-tetramethylethylenediamine. As long as the polymerizable material may be satisfactorily polymerized in the mold, it is not always necessary to incorporate the agents such as polymerization initiators into the composition together with the polymerizable material, because agents of some types in some amounts may affect the polymerization rate of the polymerizable material. Typically, the polymerization initiator and polymerization catalyst may be fed into a predetermined mold simultaneously with the feeding of the composition after preparation into the mold.

According to the present invention, a given composition is prepared by blending at least one of polymerizable materials as mentioned above with the ceramic raw material. The composition is generally prepared by adding the ceramic raw material and polymerizable material to a predetermined medium, and blending them. Thus the composition is obtained in the form of an aqueous or non-aqueous slurry containing the ceramic raw material and other components as uniformly dispersed. Exemplary usable media in which the ceramic raw material and other components are to be dispersed include water (distilled water), organic solvents, and mixtures of these solvents. Among them, water (distilled water) is preferably used to give a composition in the form of an aqueous slurry, because water is easy to handle.

When the composition is prepared as an aqueous slurry, the polymerizable material is preferably a hydrophilic or water-soluble polymerizable material, because such polymerizable material may be uniformly dispersed in the slurry.

Upon preparation of the slurry composition, a dispersant is preferably used for uniformly dispersing the powdery (or granular) substance of the ceramic raw material in the medium. The dispersant may be chosen suitably according to the types typically of the ceramic raw material and the polymerizable material, from among customarily known dispersants such as dispersants composed of ammonium polycarboxylates (anionic dispersants).

The composition for use in the present invention may further contain various components for various purposes, in addition to the above-mentioned components. Specifically, to manufacture a porous ceramic sintered compact, a slurry composition containing bubbles is to be prepared. In this case, the composition may contain a foaming agent for forming bubbles in the composition. Alternatively, when the slurry composition is to contain bubbles by introducing a gas thereinto, the composition may contain a surfactant or another similar agent which enhances the formation of the bubbles. In addition, for allowing the composition to hold the introduced bubbles stably therein, the composition may further contain a thickener and/or a sizing agent (paste). Exemplary foaming agents include protein foaming agents and surfactant foaming agents. Exemplary surfactants include alkylbenzenesulfonic acids and higher-alkyl-amino acids. Exemplary thickeners and pastes include methylcellulose, polyvinyl alcohols, sucrose, molasses, and xanthan gum.

The composition may further contain, for example, a ceramic fibrous material and/or a metallic or ceramic chip material in order to give a ceramic electrode material having higher strength. In addition or alternatively, the composition may contain trace amounts of inorganic compounds to enhance the sintering of the ceramic raw material contained in the composition.

In order to allow the resulting corrosion-resistant ceramic electrode material to have a higher catalytic capability, metal microparticles and/or metal oxide microparticles may be added to the composition, or may be supported on the sintered compact according to a suitable process as mentioned later.

The composition prepared in the above manner is fed, where necessary with a polymerization initiator and a polymerization catalyst, to a mold having a shape according to the shape of the target electroconductive ceramic product, and the composition in the mold is left stand at a predetermined temperature for a predetermined time to allow the polymerizable material in the composition to undergo polymerization.

The time and temperature for holding the composition in the mold may be set in synthetic consideration of conditions or parameters such as type of the polymerizable material and the presence or absence of the polymerization initiator and polymerization catalyst, because the polymerization of the polymerizable material in the mold proceeds at a rate varying depending on these conditions. In general, in the case of an aqueous slurry composition using water as the medium, the temperature is set to be 20° C. or higher, preferably 25° C. to 80° C., and more preferably 25° C. to 35° C., and the composition in the mold is left stand at the set temperature for a duration of 10 minutes or longer, preferably 20 minutes to several hours, and more preferably 1 to 4 hours.

When the composition containing the polymerizable material is left stand in the mold at a predetermined temperature for a predetermined time, the polymerization of the polymerizable material in the composition proceeds effectively and uniformly over the entire green body. The resulting green body, which is obtained by removing the mold after the elapse of the predetermined time, therefore has such a structure as to include a polymeric compound which is a polymer derived from the polymerizable material and which is uniformly distributed.

Particularly when a slurry composition is used, the green body obtained in the above manner contains large amounts of the medium such as water or an organic solvent and is generally dried before subjected to reducing firing.

The procedure and conditions (e.g., drying temperature and drying time) for the drying of the green body may be suitably selected and employed according typically to the respective components in the green body and to the medium (e.g., water or an organic solvent) to be evaporated. For example, when an aqueous slurry composition is used, the drying is preferably carried out by placing the green body in a chamber of a desiccator held at a temperature of about 25° C. to 30° C.; and drying the green body to humidity (relative humidity; RH) in the chamber of about 60% RH over several days while controlling the relative humidity in the chamber to decrease at a rate of about 5% to 15% RH per day.

The green body obtained in the above manner is subjected to reducing firing at a predetermined temperature in an inert gas atmosphere containing no nitrogen gas and thereby yields the ceramic electrode material according to the present invention. Exemplary inert gases containing no nitrogen gas include rare gases such as argon and helium, Specifically, when the green body including the ceramic raw material and the polymeric compound as a polymer of the carbon-containing polymerizable material, both of which are uniformly present is subjected to reducing firing, it gives a ceramic sintered compact as a result of sintering of the ceramic raw material contained in the green body. Independently, the polymeric compound gives a carbon-containing reductively fired product (electroconductive carbon) unlike regular firing in an air (oxygen) atmosphere. The reductively fired product does not scatter out of the sintered compact but remains in the sintered compact, thereby advantageously forms an electroconducting path in space between ceramic particles (at grain boundaries) constituting the sintered compact, and thereby gives a ceramic electrode material according to the present invention which exhibits excellent electroconductivity as a ceramic sintered compact.

When green bodies having the same content of the polymerizable material are subjected to reducing firing, a ceramic sintered compact obtained through reducing firing in an inert gas atmosphere containing no nitrogen gas has a higher amount of electroconductive carbon formed therein than that of a ceramic sintered compact obtained through reducing firing in a nitrogen gas atmosphere. This is because, when reducing firing is performed in a nitrogen gas atmosphere, the ceramic particles, polymerizable material, and nitrogen gas react with one another to form compounds.

Typically, when the green body before firing was allowed to have a carbon content (mass) in the entire polymerizable material of 0.1 part by mass or more and 6 parts by mass or less per 100 parts by mass of the ceramic raw material, and the green body was subjected to reducing firing in an inert gas atmosphere containing no nitrogen gas, the resulting ceramic sintered compact had a carbon content in the range of 0.3 percent by mass or more and 1.7 percent by mass or less. The carbon content is determined in a thermal analysis from a measured value of amounts of components that are thermally decomposed and burnt. The carbon content is a content by mass relative to the mass of the ceramic sintered compact. In contrast, the same green body, when subjected to reducing firing in a nitrogen gas atmosphere, gave a ceramic sintered compact having an electroconductive carbon content of 0.2 percent by mass or less.

The ceramic sintered compact preferably has a carbon content of 1.7 percent by mass or less. This is because the present inventors have verified that the ceramic sintered compact, if containing an excessively large amount of carbon, may have insufficient strength; and that the ceramic sintered compact, if having a carbon content of 1.7 percent by mass or less, may have sufficient strength.

A firing furnace usable in the reducing firing may be any one that allows the green body to be fired in a reducing atmosphere such as an argon atmosphere, and examples thereof include various firing furnaces such as graphite crucibles and electric furnaces.

Conditions (e.g., firing temperature, firing time, and rate of temperature rise) for performing the reducing firing of the green body herein may be suitably set according typically to the type of the ceramic raw material to be used. Typically, when an alumina powder is used as the ceramic raw material, the reducing firing may be performed at a predetermined firing temperature (maximum temperature) of about 1000° C. to 1700° C. for a firing time (time for holding the green body at the firing temperature) of about 1 to 5 hours.

The ceramic sintered compact can have a catalytic function by allowing the prepared ceramic sintered compact or porous ceramic sintered compact to support or bear microparticles serving as a catalytic component. The microparticles usable herein can be those composed of a metal, a metallic compound, a metal oxide, or a mixture of two or more of them. The metal usable herein may be at least one selected from platinum, nickel, palladium, and gold; the metallic compound usable herein may be at least one selected from titanium oxides and zinc oxides; and the metallic compound usable herein may be at least one selected from cadmium sulfide and strontium titanate.

The ceramic electrode material according to the present invention thus obtained not only exhibits excellent corrosion resistance and electroconductivity, but also is relatively lightweight, and excellent electroconductivity thereof shows a high degree of isotropy.

Specifically, the corrosion-resistant ceramic electrode material according to the present invention includes an electroconducting path which is formed between ceramic particles constituting the ceramic sintered compact and which is composed of a reductively fired product derived from the carbon-containing polymeric compound. The ceramic electrode material is therefore relatively lightweight as compared to a ceramic electrode material using an electroconductive material having a high density, such as a metal material.

The method for manufacturing a ceramic electrode material according to the present invention subjects a green body including a uniformly dispersed polymeric compound as a polymer of a polymerizable material to reducing firing. This allows uniform formation of an electroconducting path between ceramic particles constituting the ceramic sintered compact, which electroconducting path is composed of a reductively fired product of the polymeric compound. Accordingly, the ceramic (electrode) material shows isotropy in its electroconductivity.

The present invention will be illustrated in further detail with reference to several working examples below. It is naturally recognized, however, that these examples are never construed to limit the scope of the present invention. In addition, it should be understood that various alternations, modifications, and improvements other than the examples below and other than the specific description above are possible based on the knowledge of those skilled in the art without departing from the spirit and scope of the present invention.

EXAMPLE 1

Initially an aqueous slurry composition was prepared by blending an alumina powder (supplied by Showa Denko K.K., sinterable alumina, AL-160SG-4, average particle diameter: 0.6 µm) as a ceramic raw material, methacrylamide as a polymerizable material, N,N'-methylenebisacrylamide as a crosslinkable monomer, an ammonium polycarboxylate dispersant (Celuna D305 supplied by Chukyo Yushi Co., Ltd.) as a dispersant, and distilled water in blending quantities given in Table 1 below. The preparation of the composition was carried out by dissolving methacrylamide and N,N'-methylenebisacrylamide in distilled water; subsequently adding the ammonium polycarboxylate dispersant; further adding the alumina powder; and wet-mixing them with a ball mill on an isothermal water bath set at 25° C. for 25 hours.

TABLE 1

Table of Slurry Composition (blending quantity per 100 g of the slurry)

| | Alumina powder | Distilled water | Dispersant* | Monomer** | Crosslinking agent*** |
|---|---|---|---|---|---|
| Blending quantity [g] | 80.02 | 11.82 | 0.60 | 7.43 | 0.12 |

*Dispersant: Ammonium polycarboxylate dispersant
**Polymerizable monomer: Methacrylamide
***Crosslinking agent: N,N'-Methylenebisacrylamide The prepared composition was subjected to tests mentioned below. In the respective tests, N,N,N',N'-tetramethylethylenediamine and ammonium persulfate (ammonium peroxydisulfate) were used as a polymerization catalyst and a polymerization initiator, respectively.

EXPERIMENTAL EXAMPLE

The above-prepared composition (100 g) was further combined with 1.03 mg of the polymerization initiator and 0.17 mg of the polymerization catalyst, and a suitable amount of the composition further containing the polymerization initiator was fed to a disc-like mold having a diameter of 5 cm and a thickness of 1 cm. The methacrylamide and N,N'-methylenebisacrylamide in the composition were polymerized by leaving the mold stand in a room (temperature: 25° C.) for 3.0 hours. The resulting article was released from the mold and thereby yielded a disc-like green body.

The resulting green body was placed in a chamber of a constant humidity desiccator and dried over 3 days by reducing the relative humidity in the chamber from 90% RH to 60% RH at a rate of 10% RH per day. After the drying, the dried green body was subjected to reducing firing at a temperature of 1700° C. for 2 hours in an argon atmosphere in a compact electric furnace while introducing argon gas, and thereby yielded a series of ceramic sintered compacts. Bulk density and electric resistivity of the respective ceramic sintered compacts were measured, and the results are shown in Table 2 below. The electric resistivity was measured by a four-terminal method; the fracture strength was measured according to a three-point bending test method; and the carbon content was measured with a total carbon analyzer.

TABLE 2

Physical Properties of Ceramic Sintered Compact

| Bulk density [g/cm$^3$] | Electric resistivity [Ωcm] | Carbon content [percent by mass] | Fracture strength [MPa] |
|---|---|---|---|
| 3.11 | 0.151 | 0.84 | 108.2 |

As is demonstrated by the data in Table 2, it was verified that the ceramic sintered compact manufactured according to the method for manufacturing a ceramic electrode material according to the present invention exhibited excellent electroconductivity while maintaining the inherent strength of the ceramic, because the ceramic electrode material included 0.84 percent by mass of a reductively fired carbon component.

Next, corrosion resistance of the ceramic sintered compact and of a vitreous carbon sample and a graphite sample as control samples (comparative samples) was evaluated according to the following method. Specifically, each sample was processed to a size of several centimeters square and several millimeters thick, and the surface thereof was polished with an abrasive paper to give a test piece. An area of 1 cm long and 1 cm wide on one side of the test piece was defined as an effective area, and a portion other than the effective area was covered by an insulating masking tape. A wire was suitably connected to the test piece, whose surface other than the effective area had been insulated and covered, and thereby yielded a working electrode. The working electrode, a platinum plate electrode as a counter electrode, and a standard calomel electrode (SCE: +0.24 V vs. normal hydrogen electrode) as a reference electrode were immersed in an acidic solution, i.e., an aqueous solution of sulfuric acid in a concentration of 1 mol/dm$^3$ or in a basic solution, i.e., an aqueous solution of sodium hydroxide in a concentration of 1 mol/dm$^3$, and a applied potential was applied and scanned in the range of from −1.8 mV to +1.8 mV at a rate of 1.5 mV/s, and a current in this process was measured. Open circuit potentials determined from the measurements of the respective samples are shown in Table 3 below.

TABLE 3

Results of Electrochemical Corrosion Test

| Electrode material | Aqueous solution in corrosion test (concentration: 1 mol/dm$^3$) | Open circuit potential [mV vs. SCE*] |
|---|---|---|
| Ceramic sintered compact (present invention) | Sulfuric acid | 209.5 |
| | Sodium hydroxide | −172.3 |
| Graphite sample (control sample) | Sulfuric acid | 241.0 |
| | Sodium hydroxide | −187.2 |
| Vitreous carbon sample (control sample) | Sulfuric acid | 463.8 |
| | Sodium hydroxide | −1082.4 |

The data in Table 3 demonstrate that the ceramic electrode material according to the present invention had open circuit potentials in the acidic and basic aqueous solutions as equivalent to those of graphite, indicating that the ceramic electrode material according to the present invention has corrosion resistance equivalent to that of graphite. The data also demonstrate that the ceramic electrode material according to the present invention has absolute values of open circuit potentials smaller than those of the vitreous carbon material, indicating that the ceramic electrode material has more excellent corrosion resistance than that of the vitreous carbon material.

Independently, the ceramic sintered compact according to this example was immersed in a strong acid and in a strong base each for a predetermined time; and weight loss percentage, amount of dissolution from the sintered compact, and volume resistivity of the resulting sample were evaluated. Specifically, two test pieces each 3 mm thick, 4 mm wide, and 40 mm long were cut from the prepared ceramic sintered compact and the masses (weights) of them were measured. The specimens were immersed in 50 ml of an acid and a base, respectively, left stand therein at room temperature for four months, retrieved from the solutions, rinsed with water, washed with ethanol, dried, and their masses were weighed. Independently, the aluminum ion concentrations of the solutions after immersion were determined through inductively coupled plasma (ICP) spectrometry. In the test, 50 percent by mass sulfuric acid aqueous solution was used as the acid, and a 4 M sodium hydroxide aqueous solution was used as the basic solution.

As a result, the ceramic electrode material had a mass (weight) loss of 0.095% and an aluminum ion dissolution amount of 134 ppm after immersion in sulfuric acid for four months. In contrast, the ceramic electrode material had a mass (weight) loss of 0.134% and an aluminum ion dissolution amount of 534 ppm after immersion in the sodium hydroxide aqueous solution for four months. The ceramic electrode material showed no significant change in volume resistivity even after immersion in sulfuric acid and in the sodium hydroxide aqueous solution for four months. These results demonstrate that the ceramic electrode material according to the present invention is stable over a long period of time even under strongly acidic or strongly basic conditions.

EXAMPLE 2

Initially an aqueous slurry composition was prepared by blending an alumina powder (supplied by Showa Denko K.K., sinterable alumina, AL-160SG-4, average particle diameter: 0.6 μm) as a ceramic raw material, methacrylamide as a polymerizable material, N,N'-methylenebisacrylamide as a crosslinkable monomer, an ammonium polycarboxylate dispersant (Celuna D305 supplied by Chukyo Yushi Co., Ltd.) as a dispersant, and distilled water in blending quantities given in Table 4 below. The preparation of the composition was carried out by dissolving methacrylamide and N,N'-methylenebisacrylamide in distilled water; subsequently adding the ammonium polycarboxylate dispersant to the resulting solution; further adding the alumina powder thereto; and wet-mixing them with a ball mill in an isothermal water bath set at 25° C. for 25 hours.

TABLE 4

Table of Slurry Composition (blending quantity per 100 g of the slurry)

| | Alumina powder | Distilled water | Dispersant* | Monomer** | Crosslinking agent*** |
|---|---|---|---|---|---|
| Blending quantity [g] | 83.00 | 13.33 | 0.75 | 2.79 | 0.14 |

*Dispersant: Ammonium polycarboxylate dispersant
**Polymerizable monomer: Methacrylamide
***Crosslinking agent: N,N'-Methylenebisacrylamide The prepared composition was subjected to tests mentioned below. In the respective tests, N,N,N',N'-tetramethylethylenediamine, ammonium persulfate (ammonium peroxydisulfate), and ammonium laurylsulfate were used as a polymerization catalyst, a polymerization initiator, and a surfactant, respectively.

EXPERIMENTAL EXAMPLE

The above-prepared composition (100 g) was further combined with 1.03 mg of the polymerization initiator, 0.17 mg of the polymerization catalyst, and 0.17 ml of the surfactant, and a suitable amount of the composition further containing the polymerization initiator was fed to a disc-like mold having a diameter of 5 cm and a thickness of 1 cm. The methacrylamide and N,N'-methylenebisacrylamide in the composition were polymerized by leaving the mold stand in a room (temperature: 25° C.) for 3.0 hours. The resulting article was released from the mold and thereby yielded a disc-like porous green body.

The resulting green body was placed in a chamber of a constant humidity desiccator and dried over 3 days by reducing the relative humidity in the chamber from 90% RH to 60% RH at a rate of 10% RH per day. After the drying, the dried green body was subjected to reducing firing at a temperature of 1700° C. for 2 hours in an argon atmosphere in a compact electric furnace while introducing argon gas, and thereby yielded a series of electroconductive porous ceramic sintered compacts. Porosity and electric resistivity of the respective ceramic sintered compacts were measured, and the results are shown in Table 5 below. The electric resistivity was measured by a four-terminal method; the fracture strength was measured according to a three-point bending test method; the porosity was measured according to Japanese Industrial Standards R 1643 (Test methods for density and apparent porosity of fine ceramics); and the carbon content was measured with a total carbon analyzer. In the measurement of electric resistivity, the resistivity of the entire sintered compact including cavities (pores) was initially measured, and the measured electric resistivity was converted into a resistivity as a dense body by excluding the volume of cavities from the total volume of the sintered compact.

TABLE 5

Physical Properties of Ceramic Sintered Compact

| Porosity [%] | Electric resistivity [Ωcm] | Carbon content [percent by mass] | Fracture strength [MPa] |
|---|---|---|---|
| 65.9 | 0.12 | 0.83 | 23.1 |

The electric resistivity was 0.35 Ω·cm in terms of the entire sintered compact including cavities and was 0.12 Ω·cm in terms of a dense body. As is demonstrated by the data in Table 5, the porous ceramic sintered compact manufactured according to the method for manufacturing a ceramic electrode material according to the present invention exhibited excellent electroconductivity while maintaining the inherent strength of the ceramic even at a high porosity, because the ceramic electrode material included 0.83 percent by mass of a reductively fired carbon component.

Next, the porous ceramic sintered compact was processed into apiece of a size of several centimeters square and several millimeters thick. The piece was subjected to a surface treatment by immersing in a mixed acid of sulfuric acid and nitric acid at room temperature (temperature: 25° C.) with ultrasonic application, leaving stand therein for one hour, and immersing in a solution mixture of 0.0024 M tin chloride and 0.012 M palladium chloride.

The surface-treated porous ceramic sintered compact together with the treatment solution was heated to 100° C.; a nickel ion solution was added dropwise thereto under reflux conditions, and thus the porous ceramic sintered compact was allowed to adsorb nickel ions on its surface.

The porous ceramic sintered compact adsorbing nickel ions according to the above technique was immersed in a reducing solution containing lactic acid, diamine, and sodium ethylenediaminetetraacetate and subjected to reflux at 75° C. in a nitrogen atmosphere for 3 hours while maintaining the pH at 9.6 to allow the porous ceramic sintered compact to bear or carry nickel microparticles on its surface.

Next, the porous ceramic sintered compact carrying the nickel microparticles (test piece) was evaluated in the following manner. An area of 1 cm long and 1 cm wide on one side of the test piece was defined as an effective area, and a portion other than the effective area was covered by an insulating masking tape. A wire was suitably connected to the test piece, whose surface other than the effective area had been insulated and covered, and thereby yielded a working electrode. The working electrode, a platinum plate electrode as a counter electrode, and a standard calomel electrode (SCE: +0.24 V vs. normal hydrogen electrode) as a reference electrode were immersed in an aqueous mixed solution containing methanol in a concentration of 0.5 mol/dm$^3$ and sodium hydroxide in a concentration of 1.0 mol/dm$^3$, and a potential was applied and scanned or swept in the range of from −0.3 V to +1.3 V at a rate of 20 mV/s, and a current in this process was measured. Electrochemical properties determined based on the measurement are shown in FIG. 1.

The data in FIG. 1 demonstrate that an electrode material using the porous ceramic sintered compact according to the present invention carrying the nickel microparticles behaved so as to proceed an methanol oxidation reaction in the basic aqueous solution containing methanol, indicating that it has a catalytic capability.

Independently, the potential change with time at a fixed voltage of +0.5 V was measured under the same conditions as above evaluation. Electrochemical properties determined based on the measurement are shown in FIG. 2.

Figure 2:
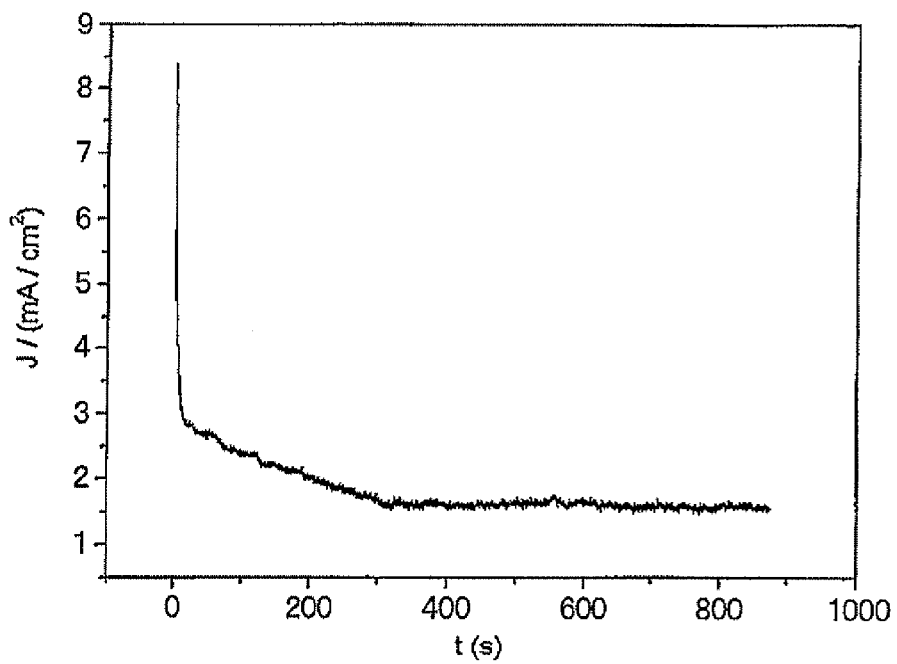
FIG. 2 is a graph indicating the electrochemical properties (current-time curve) of the porous ceramic bearing nickel microparticles.

The data in FIG. 2 demonstrate that the electrode material using the porous ceramic sintered compact according to the present invention carrying the nickel microparticles showed rapid response to the voltage application in the basic aqueous solution containing methanol and maintained a stable constant current density of about 1.5 mA/cm$^2$, indicating that it has stable performance as an electrocatalyst.

EXAMPLE 3

Initially an aqueous slurry composition was prepared by blending a silica powder (high-purity synthetic spherical silica, supplied by Admatechs Co., Ltd., ADMAFINE SO-C1, average particle diameter: 0.5 μm) as a ceramic raw material, methacrylamide as a polymerizable material, N,N'-methylenebisacrylamide as a crosslinkable monomer, and distilled water in blending quantities given in Table 6 below. The procedures from the slurry preparation to forming (shaping) and firing were performed in the same manner as in Example 1 to give a ceramic sintered compact.

TABLE 6

Table of Slurry Composition (blending quantity per 100 g of the slurry)

| | Silica powder | Distilled water | Monomer** | Crosslinking agent*** |
|---|---|---|---|---|
| Blending quantity [g] | 68.78 | 24.76 | 4.86 | 1.60 |

**Polymerizable monomer: Methacrylamide
***Crosslinking agent: N,N'-Methylenebisacrylamide The volume resistivity of the resulting ceramic sintered compact was measured by the measuring method as in Example 1 and was found to be 0.18 Ω·cm.

EXAMPLE 4

An aqueous slurry composition was prepared by blending a zirconia powder (sinterable grade, Tosoh Corporation, TZ-3Y, granular) as a ceramic raw material, methacrylamide as a polymerizable material, N,N'-methylenebisacrylamide as a crosslinkable monomer, an ammonium polycarboxylate dispersant (supplied by Chukyo Yushi Co., Ltd., Celuna D305) as a dispersant, and distilled water in blending quantities given in Table 7 below. The procedures from the slurry preparation to forming (shaping) and firing were performed in the same manner as in Example 1 to give a ceramic sintered compact.

TABLE 7

Table of Slurry Composition (blending quantity per 100 g of the slurry)

| | Zirconia powder | Distilled water | Dispersant* | Monomer** | Crosslinking agent*** |
|---|---|---|---|---|---|
| Blending quantity [g] | 81.42 | 13.23 | 2.44 | 2.65 | 0.26 |

*Dispersant: Ammonium polycarboxylate dispersant
**Polymerizable monomer: Methacrylamide
***Crosslinking agent: N,N'-Methylenebisacrylamide Industrial Applicability The corrosion-resistant ceramic electrode materials according to the present invention have sufficient electroconductivity as electrodes and corrosion resistance equivalent to or higher than that of existing carbonaceous electrodes and also have excellent properties such as mechanical strength owing to the backbone ceramics. Accordingly, they are highly expected as electrode materials in various industries. Typically, they are expected as electrodes for fused salt electrolysis in the electrolysis industry, in which the electrodes have to be operated under acidic or basic conditions; or as cathodes for secondary batteries; or as fuel electrodes (anodes) for fuel cells or as separators for polymer fuel cells. The method for manufacturing the corrosion-resistant ceramic electrode material according to the present invention is highly expected to be used in practice, because the method has advantages in manufacturing process such that the method can be performed in a simpler manner at lower cost and can manufacture materials of complicated shapes, as compared to customary methods for manufacturing electroconductive ceramic materials.

The invention claimed is:

1. A ceramic electrode material comprising:
a ceramic sintered compact, the ceramic sintered compact including ceramic particles; and a three-dimensional network electroconducting path present in a space between ceramic particles and including a reductively fired product of a carbon-containing polymeric compound, the ceramic sintered compact being prepared through reducing firing in an inert gas atmosphere containing no nitrogen gas, the ceramic electrode material having a volume resistivity of less than 0.2 Ω·cm and having corrosion resistance against acids and bases equivalent to or higher than that of graphite or a vitreous carbon material.

2. The ceramic electrode material according to claim 1, wherein:
the reductively fired product is an electroconductive carbon; and
the ceramic sintered compact has a carbon content of 0.3 percent by mass or more and 1.7 percent by mass or less.

3. The ceramic electrode material according to claim 1, wherein the ceramic particles comprise an inorganic oxide.

4. The ceramic electrode material according to claim 3, wherein the inorganic oxide is alumina.

5. The ceramic electrode material according to claim 1, wherein:
the ceramic sintered compact carries or bears microparticles comprising one selected from the group consisting of a metal, a metallic compound, a metal oxide, and mixtures thereof; and
the ceramic electrode material has a catalytic capability on methanol oxidation reaction.

6. The ceramic electrode material according to claim 5, wherein the ceramic sintered compact is porous.

7. The ceramic electrode material according to claim 5, wherein:
the metal is at least one selected from the group consisting of platinum, nickel, palladium, and gold,
the metal oxide is at least one selected from the group consisting of titanium oxides and zinc oxides, and
the metallic compound is at least one selected from the group consisting of cadmium sulfide and strontium titanate.

8. The ceramic electrode material according to claim 1, wherein the polymeric compound is one selected from the group consisting of vinyl resins, urethane resins, olefinic resins, styrenic resins, acrylic resins, haloolefinic resins, diene resins, ether resins, sulfide resins, imide resins, imine resins, phenylene resins, and epoxy resins.

9. A method for manufacturing the ceramic electrode material as claimed in claim 1, the method comprising the steps of:
placing a composition in a mold, the composition including a ceramic raw material and at least one polymerizable material intramolecularly having one or more carbon atoms, and polymerizing the polymerizable material in the mold to give a green body uniformly including a polymeric compound as a polymer derived from the polymerizable material; and
subjecting the green body to reducing firing in an inert gas atmosphere containing no nitrogen gas to give a ceramic sintered compact and to form a three-dimensional network electroconducting path in a space between ceramic particles constituting the ceramic sintered compact, the electroconducting path including a reductively fired product of the polymeric compound.

10. The method for manufacturing the ceramic electrode material, according to claim 9, wherein a polymerizable monomer is used as the polymerizable material.

11. The method for manufacturing the ceramic electrode material, according to claim 10, wherein the polymerizable monomer and a crosslinkable monomer are used as the polymerizable material.

12. The method for manufacturing the ceramic electrode material, according to claim 10, wherein an unsaturated vinyl monomer is used as the polymerizable monomer.

13. The method for manufacturing the ceramic electrode material, according to claim 9, wherein the composition is prepared in the form of an aqueous slurry, and the polymerizable material is a hydrophilic or water-soluble material.

14. The method for manufacturing the ceramic electrode material, according to claim 9, wherein the method further comprises:
controlling the carbon content of the entire polymerizable material in the green body before firing to be 0.1 part by mass or more and 6 parts by mass or less per 100 parts by mass of the ceramic raw material; and
subjecting the green body to reducing firing to allow the ceramic sintered compact to have a carbon content of 0.3 percent by mass or more and 1.7 percent by mass or less.

* * * * *